United States Patent
Wang et al.

(10) Patent No.: US 11,341,326 B2
(45) Date of Patent: May 24, 2022

(54) COMPRESSION METHOD AND PLATFORM OF PRE-TRAINING LANGUAGE MODEL BASED ON KNOWLEDGE DISTILLATION

(71) Applicant: ZHEJIANG LAB, Hangzhou (CN)

(72) Inventors: Hongsheng Wang, Hangzhou (CN); Haijun Shan, Hangzhou (CN); Fei Yang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/483,805

(22) Filed: Sep. 24, 2021

(65) Prior Publication Data
US 2022/0067274 A1 Mar. 3, 2022

Related U.S. Application Data

(63) Continuation of application No. PCT/CN2020/138019, filed on Dec. 21, 2020.

(51) Int. Cl.
| | |
|---|---|
| *G06F 17/00* | (2019.01) |
| *G06F 40/20* | (2020.01) |
| *G06N 20/20* | (2019.01) |
| *G06N 5/02* | (2006.01) |
| *G06N 7/00* | (2006.01) |

(52) U.S. Cl.
CPC .............. *G06F 40/20* (2020.01); *G06N 5/022* (2013.01); *G06N 7/005* (2013.01); *G06N 20/20* (2019.01)

(58) Field of Classification Search
None
See application file for complete search history.

(56) References Cited

U.S. PATENT DOCUMENTS

| | | | | |
|---|---|---|---|---|
| 10,575,788 | B2 * | 3/2020 | Gupta | A61B 5/352 |
| 11,210,467 | B1 * | 12/2021 | Carvalho | G06F 40/284 |
| 2018/0365564 | A1 * | 12/2018 | Huang | G06N 3/04 |
| 2020/0104642 | A1 * | 4/2020 | Wei | G06K 9/6257 |

(Continued)

FOREIGN PATENT DOCUMENTS

| | | |
|---|---|---|
| CN | 110097178 A | 8/2019 |
| CN | 110232203 A | 9/2019 |

(Continued)

OTHER PUBLICATIONS

International Search Report (PCT/CN2020/138019); dated May 26, 2021.

*Primary Examiner* — Satwant K Singh
(74) *Attorney, Agent, or Firm* — W&G Law Group

(57) ABSTRACT

Provided is a method and a platform for compressing a pre-training language model based on knowledge distillation. According to the method, a universal knowledge distillation strategy of feature migration is firstly designed, and in the process of knowledge distillation from the teacher model to the student model, the feature mapping of each layer of the student model is approaching the teacher's features, focusing on the ability of small samples to express features in the intermediate layer of the teacher model, and guiding the student model by using these features; then, a knowledge distillation method based on self-attention cross is constructed; finally, a linear transfer strategy based on Bernoulli probability distribution is designed to gradually complete the knowledge transfer of feature mapping and self-attention distribution from teachers to students.

6 Claims, 2 Drawing Sheets

(56) References Cited

U.S. PATENT DOCUMENTS

| | | | | |
|---|---|---|---|---|
| 2021/0224660 A1* | 7/2021 | Song | ................... | G06N 3/0454 |
| 2021/0335002 A1* | 10/2021 | Wang | ....................... | G06T 7/73 |
| 2021/0383238 A1* | 12/2021 | Jafari | ................... | G06F 40/284 |

FOREIGN PATENT DOCUMENTS

| | | | |
|---|---|---|---|
| CN | 110880036 A | | 3/2020 |
| CN | 111062489 A | | 4/2020 |
| CN | 111461226 A | | 7/2020 |
| CN | 111767711 A | | 10/2020 |

\* cited by examiner (a) Teacher-Self-Attention Knowledge Distillation (b) Student-Self-Attention Knowledge Distillation (c) Cross-Self-Attention Knowledge Distillation

COMPRESSION METHOD AND PLATFORM OF PRE-TRAINING LANGUAGE MODEL BASED ON KNOWLEDGE DISTILLATION

CROSS-REFERENCE TO RELATED APPLICATIONS

The present application is a continuation of International Application No. PCT/CN2020/138019, filed on Dec. 21, 2020, which claims priority to Chinese Application No. 202010910566.3, filed on Sep. 2, 2020, the contents of both of which are incorporated herein by reference in their entireties.

TECHNICAL FIELD

The present application belongs to the field of automatic compression of multitask-oriented pre-training language models, and particularly relates to a compression method and platform of a pre-training language model based on knowledge distillation.

BACKGROUND

With the popularity of smart devices, the application of large-scale language models in smart phones, wearable devices and other embedded devices is becoming more and more common. However, the scale of deep learning networks is increasing and the computational complexity is increasing, which seriously limits its application in smart devices such as mobile phones. The coping method at present is still one-way compression method that distills knowledge from the teacher model to the student model, but the problem that small samples are difficult to generalize in the process of compressing large-scale language models still exists.

SUMMARY

The purpose of the present application is to provide a compression method and platform of a pre-training language model based on knowledge distillation aiming at the shortcomings of the prior art. According to the pre-training language model compression based on knowledge distillation, a small model irrelevant to tasks is designed to learn the expression ability of a large model, a framework common to certain tasks is compressed, the compressed model framework is fully utilized, and the model compression efficiency is improved. Specifically, through the feature mapping knowledge distillation module, the self-attention cross knowledge distillation and the linear transfer strategy based on Bernoulli probability distribution, incremental mutual leaning between the teacher model and student model during the training process is realized, thus improving the learning quality of the student model in the early stage of training and the generalization ability in the late stage of training in the case of small samples The purpose of the present application is realized by the following technical solution: a method for compressing a pre-training language model based on knowledge distillation, wherein the method compresses a BERT model, which comprises a feature mapping knowledge distillation module, a self-attention cross knowledge distillation module and a linear learning module based on Bernoulli probability distribution; wherein, an original BERT model is a teacher model and the compressed BERT model is a student model; the feature mapping knowledge distillation module is based on a knowledge distillation strategy based on feature transfer; in a process of knowledge distillation from the teacher model to the student model, the feature mapping of each layer of the student model is approaching the feature mapping of the teacher model, and the student model focuses on intermediate layer features of the teacher model and uses the intermediate layer features to guide the student model; the self-attention cross knowledge distillation module realizes deep mutual learning between the teacher model and the student model by cross-connecting self-attention units of the teacher model and the student model by way of convex combination cross-connection on a network self-attention layer; the linear learning module based on Bernoulli probability distribution gradually completes the mapping of features from the teacher model to the student model and knowledge transfer from self-attentive distribution.

Furthermore, interlayer normalization is added in the feature mapping knowledge distillation module to stabilize interlayer training loss; when training the student network, two statistical differences of a mean and a variance in feature map transformation is minimized.

Furthermore, the migration objective function of the self-attention cross knowledge distillation module is to minimize a relative entropy between the attention distribution of the student model and the teacher model.

Furthermore, the self-attention cross knowledge distillation module comprises the following three stages:

a first stage: the self-attention unit of a teacher network is input into a student network, and a transfer objective function is minimized; specifically, the self-attention unit of the teacher network is regarded as a basic truth value, the student network is input at the self-attention unit of the network, and the student network receives a correct supervision signal to train a subsequent layer, avoiding a phenomenon of an excessive estimation error and propagation thereof;

a second stage: the self-attention unit of the student network is input into the teacher network and the transfer objective function is minimized; because the estimation error propagates layer by layer on the student network, there is a difference between the input of the student network and the input of the teacher network on the same layer; the self-attention unit of the student network is input to the teacher network, which makes the student network imitate an output behavior of the teacher network on the premise of the same input;

a third stage: the migration objective functions of the first stage and the second stage on the self-attention unit of the network are convexly combined to realize the distillation strategy of cross migration.

Furthermore, the linear learning module based on Bernoulli probability distribution is used for setting different linear migration probabilities for driving the feature mapping knowledge distillation module and the self-attention cross knowledge distillation module, and comprises the following two steps:

step 1, the feature mapping knowledge distillation module and the self-attention cross knowledge distillation module both adopt the migration probability of Bernoulli probability distribution, that is, assuming that an $i^{th}$ module is currently migrated, a random variable X is sampled through a Bernoulli distribution, and X is 0 or 1; the random variable being 1 represents that transfer learning is performed for a current module, otherwise, transfer learning is not performed;

step 2: although setting a constant migration probability p in step 1 can meet the needs of a compression model, a linear learning-driven migration probability is helpful to gradually migrate an encoder module in the model; this step designs a linear learning-driven migration probability $p_{linear}$ to dynamically adjust the migration probability p in step 1, namely $$p_{linear}=\min(1,k*i+b)$$

where, $p_{linear}$ represents the migration probability of the current migration module, migration of the $i^{th}$ module corresponds to an $i^{th}$ step of a current training, and b represents an initial migration probability without training; k is a dynamic value greater than 0, and when the training is increased to 1000 steps, 5000 steps, 10000 steps and 30000 steps, $p_{linear}$ is gradually increased to 0.25, 0.5, 0.75 and 1.00 in turn.

Furthermore, the initial transition probability b ranges from 0.1 to 0.3.

A compression platform for compressing a pre-training language model based on knowledge distillation according to the above method includes the following components:

a data loading component which is used to obtain a multitask-oriented BERT model and a training sample thereof; wherein the training samples is a labeled text sample satisfying supervision of a learning task;

a compression component which used to compress a multitask-oriented large-scale language model, including a teacher model fine-tuning module, a teacher-student model distillation module and a student model fine-tuning module; wherein, the teacher model fine-tuning module is responsible for loading the BERT model, inputting the training sample into the BERT model containing downstream tasks for fine-tuning and outputting a teacher model; by utilizing the teacher model obtained by the teacher model fine-tuning module, the teacher-student model distillation module gradually completes the feature mapping from teachers to students and knowledge distillation of self-attention distribution and updates weight parameters of each unit module of a student network through the feature mapping knowledge distillation module, the self-attention cross knowledge distillation module and the linear learning module based on Bernoulli probability distribution; the student model fine-tuning module recombines all encoder unit modules of the student network into a complete encoder, and uses a feature layer and an output layer of the teacher network to fine-tune a downstream task scene, and outputs the fine-tuned student model as a final compression model; and a reasoning component which is used for reasoning the downstream tasks of natural language processing on a data set of an actual scene by utilizing the compression model output by the compression component.

Furthermore, the compression component outputs the compression model to a designated container for users to download, and presents comparison information of model sizes before and after compression; the reasoning component uses the compression model to reason the downstream tasks of natural language processing, and presents the comparative information of reasoning speed before and after compression.

According to the present application, the deployment process of the large-scale deep learning language model on end-side equipment with a small memory and limited resources is promoted. The large-scale natural language processing pre-training model represented by BERT significantly improves the effect of tasks of natural language processing and promotes the development of natural language processing field. Although BERT and other models are very effective, it is difficult to meet the needs of actual scenes if a dialogue robot can only process one message in one second. Moreover, the model with billions of parameters, super-large GPU machine learning cluster and long model training time have hindered the landing of the model. In order to solve the pain points faced by the above-mentioned industrial landing, the compression platform of a pre-training language model based on knowledge distillation of the present application is used to compress the general architecture of a certain kind of tasks of natural language processing, and the compressed model architecture is fully utilized, which can reduce the calculation amount, reduce the model volume and speed up the model reasoning speed on the premise of ensuring that the performance and accuracy of the existing model are basically unchanged. In addition, large-scale natural language processing models can be deployed on end-side devices with a small memory and limited resources.

DESCRIPTION OF EMBODIMENTS

Figure 1:
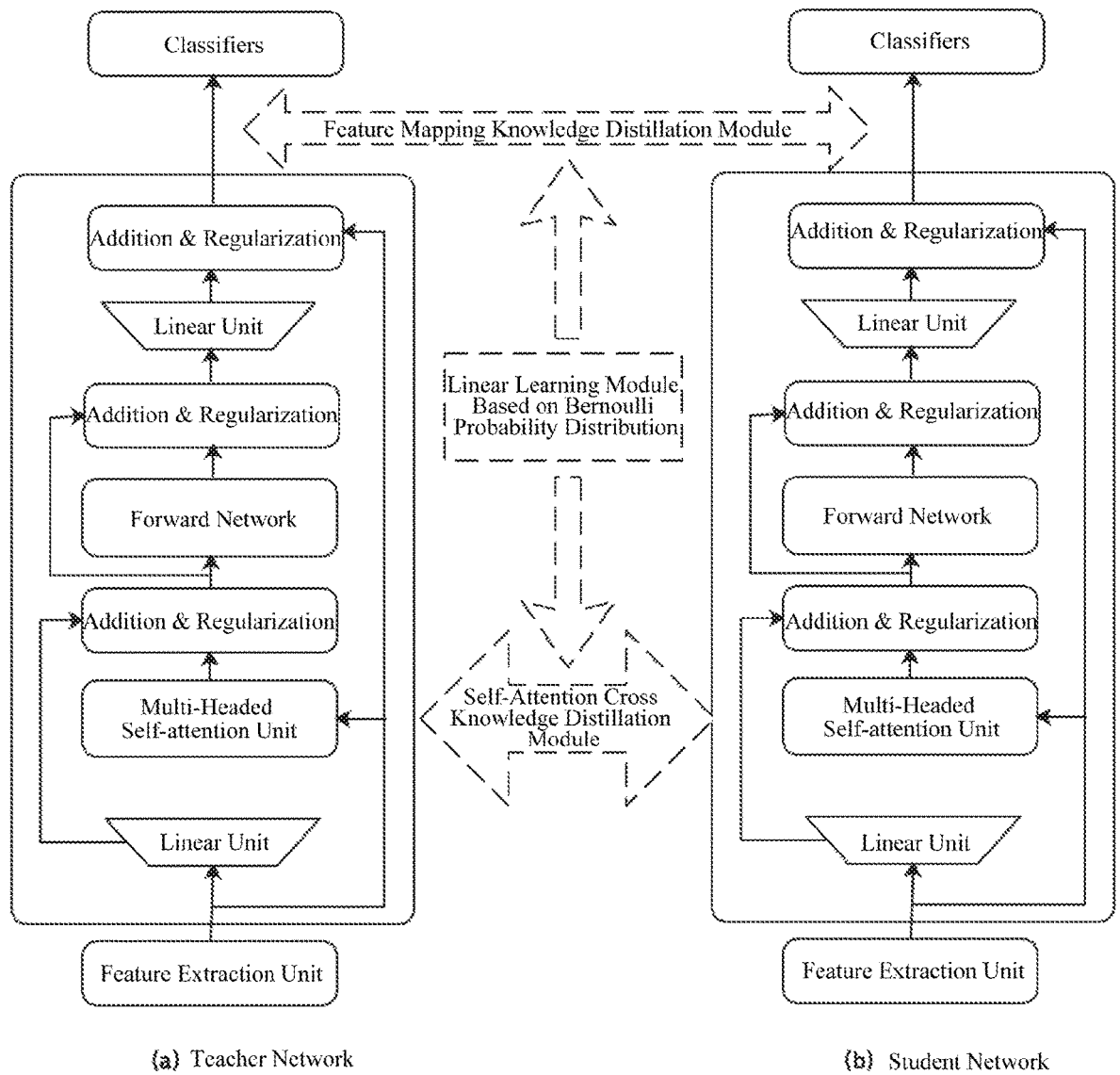
FIG. 1 is an overall architecture diagram of the method and platform for compressing a pre-training language model based on knowledge distillation according to the present application.

As shown in FIG. 1, a pre-training language model compression method based on knowledge distillation includes a feature mapping knowledge distillation module, a self-attention cross knowledge distillation module and a linear learning module based on Bernoulli probability distribution. Wherein, the feature mapping knowledge distillation module is a universal knowledge distillation strategy of feature transfer. In the process of distilling the knowledge of a teacher model to a student model, the feature mapping of each layer of the student model is approaching the features of the teacher, and the student model pays more attention to the intermediate layer features of the teacher model, and uses these features to guide the student model. The self-attention cross-knowledge distillation module, that is, the self-attention module which cross-connects the teacher network and student network, realizes the deep mutual learning between the teacher model and the student model by means of convex combination cross-connection on the network self-attention layer. The linear learning module based on Bernoulli probability distribution gradually completes the feature mapping of from teachers to students and knowledge transfer of self-attention distribution, and sets different linear transfer probabilities for driving the feature mapping knowledge distillation module and the self-attention cross knowledge distillation module.

According to the compression method of a pre-training language model based on knowledge distillation, a BERT (bidirectional encoder representations from transformers) model is compressed, and the compressed model architecture is utilized to improve the compression efficiency. In the present application, an encoder unit is taken as the basic unit of the module; the original model is called the teacher model for short, and the compressed model is called the student model for short. Assuming that the compression ratio of model layers is 2, that is, half of the layers are compressed. The original teacher model has 12 layers, and the compressed model has 6 layers, so for the student model, there are 6 modules, each of which contains an encoder unit. For the teacher model, the 12 layers are divided into 6 modules, and each module contains two encoder units. At this time, a one-to-one mapping relationship is established between the teacher model and the student model, and then formal compression steps can be carried out; the whole process is implemented in the fine-tuning stage of the downstream task of a specific task of natural language processing, not in the pre-training stage. In order to speed up the whole training process, all unit modules of the student model are initialized by using partial weights of the teacher model, that is, the weights of the encoder unit of the first six layers of the teacher model are shared with the weights of the encoder unit of the six layers of the student model.

The whole process of the compression method of the present application is divided into three stages. The first stage is to fine-tune the teacher model. First, the 12-layer original BERT model needs to be used to fine-tune a teacher model. The second stage is feature mapping knowledge distillation and self-attention cross-knowledge distillation. In this stage, both the teacher model and the student model are considered, so that both models can participate in the training; The third stage is to fine-tune the student model separately, in order to let all the modules of the student model participate in the training task completely; the specific process is as follows:

step 1: a pre-training BERT model and a data set are loaded, and the teacher model is fine-tuned; the BERT model can include a specific downstream task of natural language processing.

step 2: as shown in FIG. 1, the weight parameters of the self-attention unit module of the student network are frozen, the feature mapping knowledge distillation process from the teacher model to the student model is completed by using the linear learning strategy of Bernoulli probability distribution, and the weight parameters of other unit modules of the student network are updated, including the following substeps:

(2.1) assuming that the $i^{th}$ feature mapping module is currently migrated, firstly, a random variable X (X is 0 or 1) is sampled through a Bernoulli distribution; the random variable being 1 represents that migration learning is performed for the current module, and the feature mapping unit of the current teacher network is linearly migrated, otherwise, it is not performed;

(2.2) considering that the linear learning-driven migration probability can gradually migrate the feature mapping module in the model, a linear learning-driven migration probability $p_{linear}$ is designed in this step to dynamically adjust the migration probability in step (2.1), namely $$p_{linear} = \min(1, k*i+b)$$

where, $p_{linear}$ represents the migration probability of the current migration module, migration of the $i^{th}$ module corresponds to an $i^{th}$ step of a current training, and b represents an initial (when i is 0) migration probability without training, and ranges from 0.1 to 0.3; k is a dynamic value greater than 0, and when the training is increased to 1000 steps, 5000 steps, 10000 steps and 30000 steps, $p_{linear}$ is gradually increased to 0.25, 0.5, 0.75 and 1.00 in turn;

(2.3) the mean square error between the feature mapping of the teacher model and the student model is used as the objective function of knowledge transfer, and interlayer normalization is added to stabilize the interlayer training loss; when training the student network, the statistical differences of the mean and variance in feature map transformation is minimized.

Figure 2:
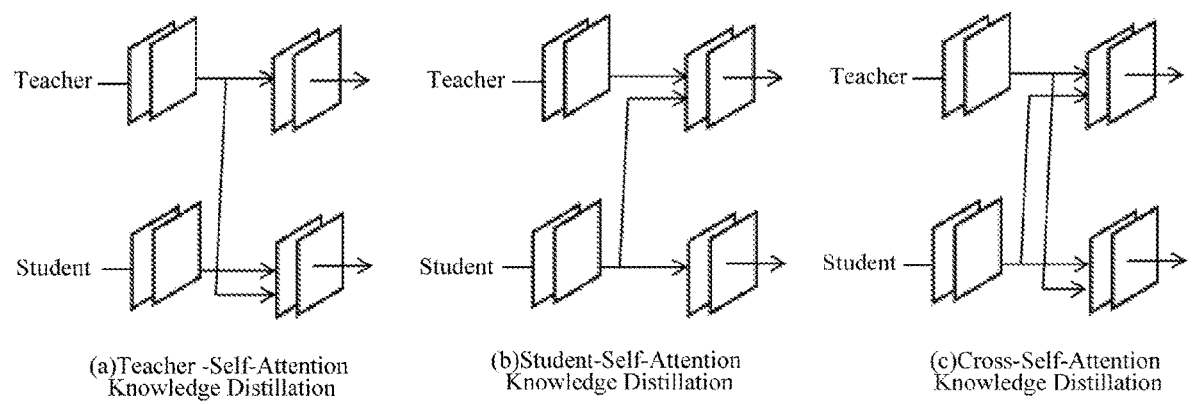
FIG. 2 is a schematic diagram of a cross knowledge distillation process of a self-attention unit.

Step 3: as shown in FIG. 2, knowledge distillation of self-attention distribution from teachers to students is gradually completed in the self-attention knowledge distillation stage, the weight parameters of each unit module of the student network are updated, and convex combination cross-connection between the self-attention units of the teacher and the student network is implemented; wherein, the transfer objective function is to minimize the relative entropy between the attention distribution of the student model and teacher model; the following substeps are included:

(3.1) The self-attention unit of a teacher network is input into a student network, and a transfer objective function is minimized; specifically, the self-attention unit of the teacher network is regarded as a basic truth value, the student network is input at the self-attention unit of the network, and the student network receives a correct supervision signal to train a subsequent layer, avoiding a phenomenon of an excessive estimation error and propagation thereof; of course not the self-attentive unit from each teacher network will be input into the student network, and the self-attentive unit migration strategy for the teacher network for linear learning based on Bernoulli probability distribution includes the following substeps.

(3.1.1): assuming that an $i^{th}$ module is currently migrated, a random variable X is sampled through a Bernoulli distribution, and X is 0 or 1; the random variable being 1 represents that the current module implements transfer learning, and linear migration is implemented for the self-attention unit of the current teacher network; otherwise, it is not performed;

(3.1.2): although setting a constant migration probability p in step 1 can meet the needs of a compression model, a linear learning-driven migration probability is helpful to gradually migrate an encoder module in the model; this step designs a linear learning-driven migration probability $p_{linear}$ to dynamically adjust the migration probability p in step 1, namely $$p_{linear} = \min(1, k*i+b)$$

where, $p_{linear}$ represents the migration probability of the current migration module, migration of the $i^{th}$ module corresponds to an $i^{th}$ step of a current training, and b represents an initial (when i is 0) migration probability without training and ranges from 0.1 to 0.3; k is a dynamic value greater than 0, and when the training is increased to 1000 steps, 5000 steps, 10000 steps and 30000 steps, $p_{linear}$ is gradually increased to 0.25, 0.5, 0.75 and 1.00 in turn.

(3.2) The self-attention unit of the student network is input into the teacher network, and the transfer objective function is minimized. Because the estimation error is propagated layer by layer on the student network, there is a big difference between the input of the student network and the input of the teacher network in the same layer. The self-attention unit of the student network is input to the teacher network, which makes the student network imitate the output behavior of the teacher network with the same input condition. Meanwhile, the self-attention unit transfer strategy of the student network based on Bernoulli probability distribution is the same as that of the teacher network in step (3.1).

(3.3) Convex combination is carried out for the migration objective functions in steps (3.1) and (3.2) to realize the distillation strategy of cross migration. The whole integrated model still uses the target loss of downstream tasks for training. Here, attention is paid to a training detail: considering that the weight of the teacher network has reached a relatively stable state in the original fine-tuning stage of step 1, if it is made to involve in the integrated training of the teacher-student network at this time, it will lead to forgetting problem. In addition, the purpose of step 3 is to update each unit module of the student network as much as possible. If the teacher network is involved in gradient update, the unit module of the student network may be ignored. Freezing the weight of the teacher network can also improve the efficiency of the whole model training. Based on the above considerations, in the case of gradient transmission, all the weight parameters belonging to the teacher network are frozen and do not participate in the gradient calculation, and the weight parameters of the relevant unit modules of the student network participate in the gradient update.

Step 4: The student model is fine-tuned independently. After step 3, because only some different unit modules of the student network participate in the training, and all the unit modules of the student network are not integrated to participate in the task training, it is necessary to add a separate process of fine-tuning the student model. All encoder unit modules of the student network are recombined into a complete encoder, and the feature layer and output layer of the teacher network are used to fine-tune the downstream task scene, and finally the compressed model is output for reasoning downstream tasks.

The present application discloses a compression platform of a pre-training language model based on knowledge distillation, which includes:

a data loading component, which is used for obtaining the training samples uploaded by the a login user and to be compressed, including a BERT model with specific downstream tasks of natural language processing and the multi-task-oriented pre-training language model, wherein the training samples are labeled text samples meeting the supervision of learning tasks;

a compression component which is used to compress the multitask-oriented large-scale language model, including a teacher model fine-tuning module, a teacher-student model distillation module and a student model fine-tuning module;

the teacher model fine tuning module is responsible for loading the BERT pre-training model, inputting the training samples into the teacher model (a BERT model including downstream tasks) for fine tuning and outputting the teacher model;

the teacher-student model distillation module updates the weight parameters of each unit module of the student model based on feature mapping knowledge distillation, self-attention cross knowledge distillation and linear learning based on Bernoulli probability distribution by using the teacher model obtained by the teacher model fine tuning module;

the student model fine-tuning module performs fine-tuning based on the student model obtained by knowledge distillation, recombines all encoder unit modules of the student network into a complete encoder, fine-tunes the downstream task scene by using the feature layer and the output layer of the teacher network, and outputs the finally fine-tuned student model, that is, the pre-training language model compression model containing the downstream task required by the login user; the compression model is output to a designated container for downloading by the login user, and the comparison information of the model size before and after compression is represented on the page of the output compression model of the platform;

a reasoning component: the login user obtains the compression model from the platform, and the user uses the compression model output by the compression component to reason the new data of the downstream tasks of the natural language processing uploaded by the login user on the data set of the actual scene; and the comparison information of reasoning speed before and after compression is presented on the reasoning page of the compression model of the platform.

According to the present application, compression can be carried out according to the BERT model uploaded by the login user and containing a specific downstream task of natural language processing, and the login user can download the compressed model architecture generated by the platform and deploy it on the terminal. The downstream tasks of natural language processing can also be inferred directly on the platform.

According to the present application, a self-attention cross knowledge distillation strategy is designed, and the ability of the self-attention distribution of the teacher model for detecting semantics and syntax between words is fully utilized; in the early stage of training, the student network receives the supervision signal of the self-attention layer of the teacher network to train the subsequent layer, thereby avoiding the phenomenon that the estimation error is too large and is propagated. At the later stage of training, the self-attention layer of the student network is input to the teacher network, so that the student network can imitate the output behavior of the teacher network with the same input. The strategy of convex combination cross knowledge distillation on the network self-attention layer promotes the teacher model and the student model to learn from each other deeply. This feature greatly improves the generalization ability of the large-scale language compression model with small samples. In addition, through the strategy of migration of a linear learning driven encoder module based on Bernoulli probability distribution, in the initial training stage, encoder modules of more teacher models can participate in learning, and feature mapping and self-attention knowledge of more teacher models can be involved, thus improving the quality of the whole student model and obtaining smaller loss function values, thus making the whole training process smooth and avoiding the phenomenon of excessive shock in the early learning process of the model. In the later stage of training, when the overall performance of the student model is better, the knowledge of more student models is allowed to participate in the learning, which makes the student model gradually get rid of the dependence on the teacher model, makes the whole model smoothly transition to the fine-tuning stage of the student model, and improves the generalization ability of the whole model.

Next, the technical solution of the present application will be further described in detail with the task of emotional classification of movie reviews.

A BERT model and an emotion analysis data set SST-2 of a text classification task of a single sentence uploaded by a login user are acquired through a data loading component of the platform;

A BERT pre-training model is loaded through the platform, and the BERT model containing text classification tasks is fine-tuned to obtain a teacher model.

Through the compression component of the platform, the feature mapping from teachers to students and the knowledge distillation of self-attention distribution are gradually completed, and the weight parameters of each unit module of the student network are updated.

The student model based on the knowledge distillation is fined-tuned, all encoder unit modules of the student network are combined into a complete encoder, and the downstream task scene is fined-tuned by using the feature layer and the output layer of the teacher network. Finally, the platform outputs the compressed model of the BERT model including text classification tasks required by the login user.

The compression model is output to a designated container for the login user to download, and the comparison information of the model size before and after compression is presented on the page of the output compression model of the platform. The model size before compression is 110 M, and the model size after compression is 66 M, i.e., it is compressed by 40%. As shown in Table 1 below.

TABLE 1

Comparative information before and after compression of a text classification task BERT model

| Text classification task (SST-2) (including 67K samples) | Before compression | After compression | Comparison |
|---|---|---|---|
| Model size | 110M | 66M | Compression by 40% |
| Reasoning accuracy | 91.5% | 91.8% | Increase by 0.3% |

Through the reasoning component of the platform, the SST-2 test set data uploaded by the login user is reasoned by using the compression model output by the platform, and it is presented on the compression model reasoning page of the platform that the reasoning speed is 1.95 times faster than that before compression, and the reasoning accuracy is improved from 91.5% before compression to 91.8%.

What is claimed is:

1. A method for compressing a pre-training language model based on knowledge distillation, wherein the method compresses a BERT model, which comprises a feature mapping knowledge distillation module, a self-attention cross knowledge distillation module and a linear learning module based on Bernoulli probability distribution; wherein, an original BERT model is a teacher model and a compressed BERT model is a student model; the feature mapping knowledge distillation module is based on a knowledge distillation strategy based on feature transfer; in a process of knowledge distillation from the teacher model to the student model, feature mapping of each layer of the student model is approaching feature mapping of the teacher model, and the student model focuses on intermediate layer features of the teacher model and uses the intermediate layer features to guide the student model; the self-attention cross knowledge distillation module realizes deep mutual learning between the teacher model and the student model by cross-connecting self-attention units of the teacher model and the student model by way of convex combination cross-connection on a network self-attention layer; the linear learning module based on Bernoulli probability distribution gradually completes feature mapping from the teacher model to the student model and knowledge transfer from self-attentive distribution;

the self-attention cross knowledge distillation module comprises the following three stages:

a first stage: the self-attention unit of a teacher network is input into a student network, and a transfer objective function is minimized; specifically, the self-attention unit of the teacher network is regarded as a basic truth value, the student network is input at the self-attention unit of the network, and the student network receives a correct supervision signal to train a subsequent layer, avoiding a phenomenon of an excessive estimation error and propagation thereof;

a second stage: the self-attention unit of the student network is input into the teacher network and the transfer objective function is minimized; because the estimation error propagates layer by layer on the student network, there is a difference between an input of the student network and an input of the teacher network on a same layer; the self-attention unit of the student network is input to the teacher network, which makes the student network imitate an output behavior of the teacher network on the premise of a same input;

a third stage: migration objective functions of the first stage and the second stage on the self-attention unit of the network are convexly combined to realize the distillation strategy of cross migration;

the linear learning module based on Bernoulli probability distribution is configured to set different linear migration probabilities for driving the feature mapping knowledge distillation module and the self-attention cross knowledge distillation module, and comprises the following two steps:

step 1, the feature mapping knowledge distillation module and the self-attention cross knowledge distillation module both adopt the migration probability of Bernoulli probability distribution, that is, assuming that an $i^{th}$ module is currently migrated, a random variable X is sampled through a Bernoulli distribution, and X is 0 or 1; the random variable being 1 represents that transfer learning is performed for a current module, and the random variable not being 1 represents that transfer learning is not performed;

step 2: although setting a constant migration probability p in step 1 can meet the needs of a compression model, a linear learning-driven migration probability is helpful to gradually migrate an encoder module in the model; this step designs a linear learning-driven migration probability $p_{linear}$ to dynamically adjust the migration probability p in step 1, namely $$p_{linear}=\min(1,k*i+b)$$

where, $p_{linear}$ represents the migration probability of the current migration module, migration of the $i^{th}$ module corresponds to an $i^{th}$ step of a current training, and b represents an initial migration probability without training; k is a dynamic value greater than 0, and when the training is increased to 1000 steps, 5000 steps, 10000 steps and 30000 steps, $p_{linear}$ is gradually increased to 0.25, 0.5, 0.75 and 1.00 in turn.

2. The method for compressing a pre-training language model based on knowledge distillation according to claim 1, wherein interlayer normalization is added in the feature mapping knowledge distillation module to stabilize interlayer training loss; when training the student network, two statistical differences of a mean and a variance in feature map transformation is minimized.

3. The method for compressing a pre-training language model based on knowledge distillation according to claim 1, wherein the migration objective function of the self-attention cross knowledge distillation module is to minimize a relative entropy between attention distribution of the student model and the teacher model.

4. The method for compressing a pre-training language model based on knowledge distillation according to claim 1, wherein the initial transition probability b ranges from 0.1 to 0.3.

5. A platform for the method for compressing a pre-training language model based on knowledge distillation according to claim 1, wherein the platform comprises the following components:
- a data loading component which is configured to obtain a multi-task oriented BERT model and a training sample thereof; wherein the training samples is a labeled text sample satisfying supervision of a learning task;
- a compression component which configured to compress a multitask-oriented large-scale language model, comprising a teacher model fine-tuning module, a teacher-student model distillation module and a student model fine-tuning module; wherein, the teacher model fine-tuning module is responsible for loading the BERT model, inputting the training sample into the BERT model containing downstream tasks for fine-tuning and outputting a teacher model; by utilizing the teacher model obtained by the teacher model fine-tuning module, the teacher-student model distillation module gradually completes the feature mapping from teachers to students and knowledge distillation of self-attention distribution and updates weight parameters of each unit module of a student network through the feature mapping knowledge distillation module, the self-attention cross knowledge distillation module and the linear learning module based on Bernoulli probability distribution; the student model fine-tuning module recombines all encoder unit modules of the student network into a complete encoder, and uses a feature layer and an output layer of the teacher network to fine-tune a downstream task scene, and outputs the fine-tuned student model as a final compression model; and
- a reasoning component which is configured for reasoning the downstream tasks of natural language processing on a data set of an actual scene by utilizing the compression model output by the compression component.

6. The platform according to claim 5, wherein the compression component outputs the compression model to a designated container for users to download, and presents comparison information of model sizes before and after compression; the reasoning component uses the compression model to reason the downstream tasks of natural language processing, and presents the comparative information of reasoning speed before and after compression.

* * * * *